Nov. 17, 1959   K. A. PAINE, JR., ET AL   2,913,200
SEPARABLE MOUNTING FOR ELECTRIC MOTORS OR THE LIKE
Filed July 6, 1954   2 Sheets-Sheet 1
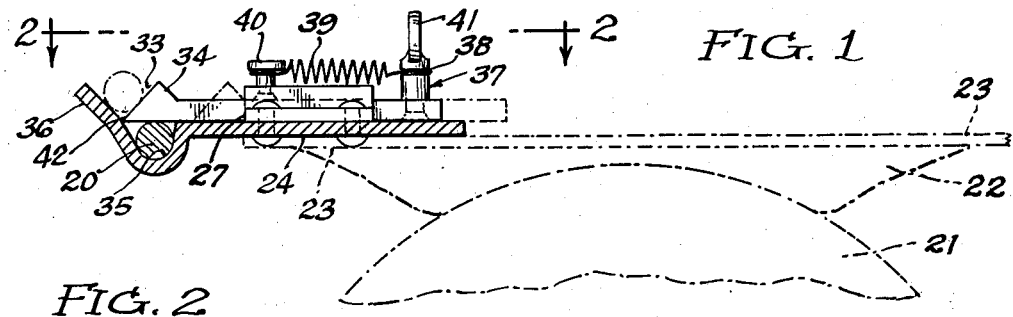
FIG. 1
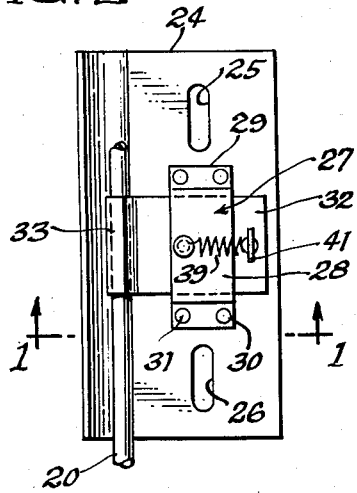
FIG. 2
FIG. 3
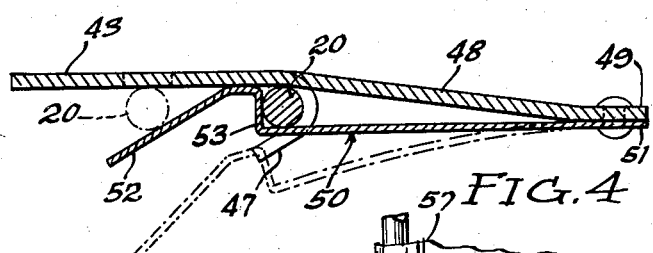
FIG. 4
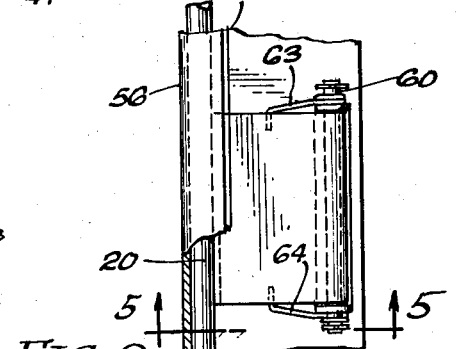
FIG. 5
FIG. 6
INVENTORS
Karl A. Paine, Jr
Paul B. McKain
By G. Thrall Brewer
Atty INVENTORS
Karl A. Paine, Jr.
Paul B. McKain
By G. Thrall Brewer
Att'y United States Patent Office 2,913,200
Patented Nov. 17, 1959

2,913,200

SEPARABLE MOUNTING FOR ELECTRIC MOTORS OR THE LIKE

Karl A. Paine, Jr., Park Ridge, and Paul B. McKain, Chicago, Ill., assignors to Duro Metal Products Co., Chicago, Ill., a corporation of Illinois Application July 6, 1954, Serial No. 441,506

3 Claims. (Cl. 248—16)

This invention relates to readily separable mountings for electric motors and the like.

A tool intended for intermittent use, such as a home woodworking tool or a motor driven appliance, must be inexpensive in initial cost to justify its purchase. For a complete woodworking operation it may be necessary to have a plurality of tools such as a saw, a drill press, a lathe, a planer and a jig saw. Approximately half the cost of each tool, however, is accounted for by the motor used to drive the tool. It has accordingly been proposed to reduce the cost of a complete set of tools by supplying each of the tools without the motor and then providing a single motor with means for quickly and readily attaching the motor to or removing it from any one of the tools. By this expedient substantially forty percent of the cost of a complete set of tools can be saved.

Several forms of quickly detachable mounting means for a motor adapted for use with home power tools have been proposed. A number of such forms are disclosed in the copending applications of Odlum and Hosford, Ser. No. 429,428, filed May 13, 1954, and Harry Wieland, Ser. No. 438,388, filed June 22, 1954. In the Odlum et al. forms, the mounting is a hinged mounting which is separable at the hinge pin by sliding one part of the hinge over the end of the pin. In the Wieland forms, the mounting is comprised of a clamp which is adapted to embrace a standard flange mounting of an electric motor so that the motor as a whole can be removed from a machine without requiring that a part of the mounting be affixed permanently to the motor to adapt it for use with the available machines.

The motor used to power the average home woodworking tool may weigh between 25 and 30 pounds. The location of the motor on each tool varies so that in one instance the motor may be mounted below a bed or bench, in another instance it may be mounted vertically and in somewhat elevated fashion as in a drill press; in yet another instance it may be mounted above a bench and to the rear of the tool, etc. Thus, it must in all cases be brought to and held in its approximate position on the machine for a brief period by the person intending to use the machine. Because of the weight of the motor, both hands of the user are generally required to hold the motor in place. If, in addition to holding the motor in place, it is necessary for the user to perform some locking operation on the mounting by hand, the entire installation becomes awkward since the user must then support the motor with one hand while the other is performing the additional locking operation.

The principal object of the present invention is the provision of a separable mounting for an electric motor or the like wherein said motor is automatically locked in place after it is properly located on the mounting.

As a more specific object, this invention seeks to provide a mounting for an electric motor or the like wherein the motor is located on its mounting and locked thereto by a spring latch mechanism, all in one movement by the user of the motor.

As a still more specific object, this invention seeks to provide an attachment to a base of an electric motor having a U-shaped trough or groove by which the attachment may be hung on a rod or the like, with means for automatically closing the open end of the trough or groove after the attachment is mounted on the rod.

These and other objects of this invention will become apparent from the following detailed description when taken together with the accompanying drawings in which:

Fig. 1 is a side elevational view, in section, of one form of this invention;

Fig. 2 is a plan view on a reduced scale of the form shown in Fig. 1, taken along line 2—2 thereof;

Fig. 3 is a plan view of a modification of the mounting means of Fig. 1;

Fig. 4 is an enlarged end elevation in section of the modification of Fig. 3 taken along line 4—4 thereof;

Fig. 5 is a side elevational view in section of a second modification of the mounting means of Fig. 1, the view being taken along line 5—5 of Fig. 6;

Fig. 6 is a fragmentary plan view on a reduced scale of the modification shown in Fig. 5;

Figures 7, 8:
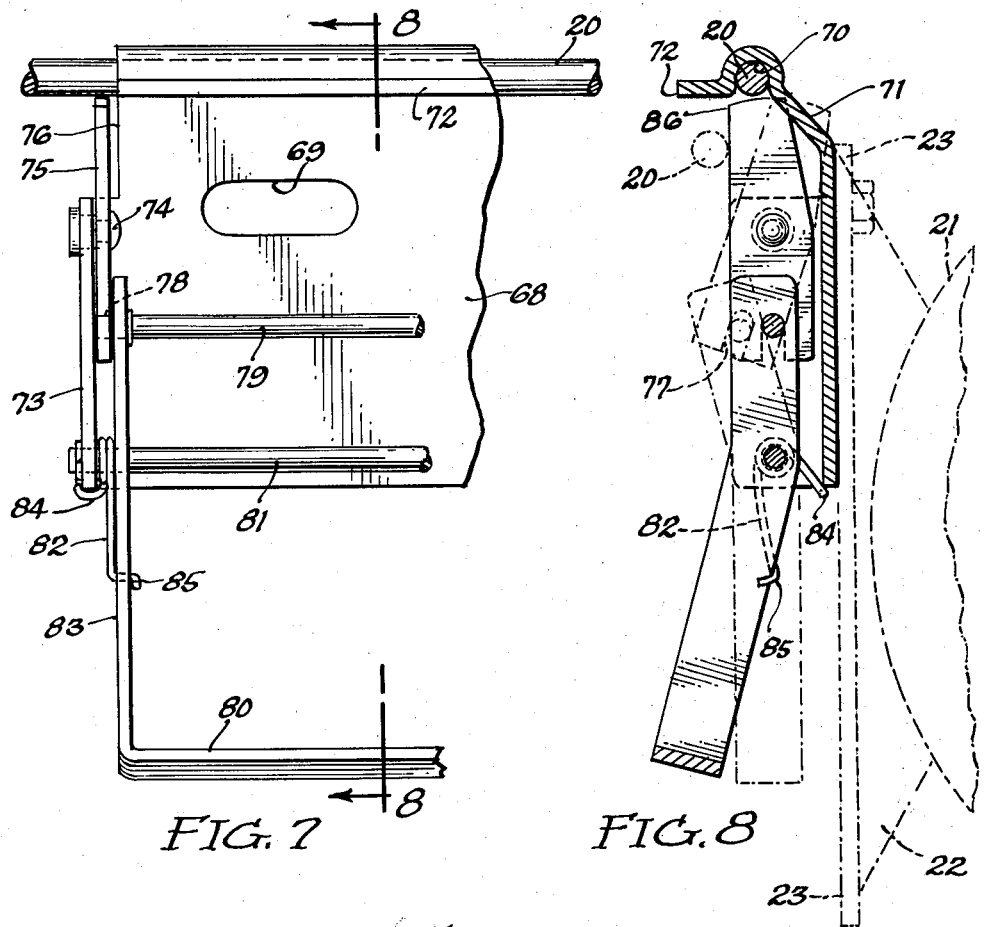
Fig. 7 is an elevational view of a portion of a third modification.
Fig. 8 is an end elevational view in section of the modification shown in Fig. 7, taken along line 8—8 thereof.

To simplify and shorten the disclosure, the details of the machines to which the motor mountings of Figs. 1 to 10, inclusive, may be applied, as well as of the motors themselves, will be omitted. Only that much of a motor is shown in Figs. 1 and 8 as is necessary to show the manner in which the motor is secured to the mounting. It is also understood that this invention may be applied to devices other than woodworking tools, and may be applied, for example, to electrical appliances generally found in a home or workshop.

It is assumed in the description of all of the modifications disclosed herein that the tool or appliance to which the motor is to be secured is equipped with a pin or rod supported in such manner as to leave a substantial portion thereof free of contact with any portion of the tool or appliance, i.e., with a substantial free span. It is contemplated that each of the motor mounting means hereinafter to be described will cooperate with such a pin over the free span thereof.

Referring now to Fig. 1, there is disclosed a pin 20 which it is understood is fixed to the frame of a machine (not shown) and has a free span over a portion of the length thereof. To pin 20 there is to be attached for swinging movement therearound a motor 21, only a portion of which is shown; said motor 21 having a base 22 provided with laterally extending coplanar attaching flanges 23. The axis of pin 20 and the axis of motor 21 may be horizontal, vertical or at any other desired inclination necessary or desirable to enable the motor to perform its desired function. Likewise motor 21 may be suspended in an inverted position without affecting the operation of the attaching device.

A generally rectangular attaching plate 24, shown more clearly in plan view in Fig. 2, is secured to motor 21. Said plate 24 is provided with slots 25, 26 of such dimension and location as to overlie the standard N.E.M.A. slots (not shown) provided in flange 23 of motor base 22. Plate 24 thus may be secured permanently to attaching flange 23 by suitable bolts passing through openings 25 and 26 and through the corresponding overlying slots in the motor base 22 so that plate 24 becomes a part of the motor base.

Substantially centrally located on plate 24 is a U-shaped strap 27 having a central region 28 (the bottom of the U) spaced from the surface of plate 24 and having flanges 29, 30 extending laterally from the inner ends of the sides of the U and overlying plate 24. Flanges 29, 30 are secured to plate 24 by rivets 31 or by other suitable attaching means such as machine screws, or by spot welding, brazing, and the like.

In the space formed by central region 28 and the adjacent surface of plate 24 is disposed a substantially rectangular latch 32, which fits sufficiently closely in the space to be guided by said strap 27 in its movements transversely thereof. The left hand edge of latch 32 as viewed in Figs. 1 and 2 has a bevel 33 the area of which is increased by a thickened region 34 on latch 32 adjacent said left hand edge thereof.

Plate 24 is depressed at its left hand edge as viewed in Fig. 2 to form a groove 35 of sufficient depth to accommodate the entire diameter of pin 20. The free end 36 of plate 24 forms an extension of the left hand side (Fig. 1) of groove 35 but at a slightly smaller angle relative to the general plane of plate 24. Said extension 36 functions as a stop for latch 34, and with bevel 33 forms a trough into which pin 20 may initially be inserted. It may be noted that the length of free end 36 as well as of bevel 33 is sufficiently greater than the diameter of pin 20 as to make unnecessary an accurate alignment of these elements with pin 20 before the pin can be inserted into the aforementioned trough.

Latch 32 may be manipulated by a pin 37 secured to the right hand end of the latch, as viewed in Figs. 1 and 2, by any suitable means which does not protrude beyond the lower surface of the latch. Pin 37 has a peripheral groove 38 disposed substantially centrally thereof around which is hooked one end of a tension spring 39, the other end of the spring being hooked around a pin 40 secured to central region 28 on strap 27. The disposition of pins 40 and 37 is such that the force of spring 39 is exerted in a direction substantially normal to the axis of pin 20. The free end 41 of pin 37 is broadened and preferably flattened to form a finger rest so that it may be contacted by either the thumb or a finger of the user's hand when it is desired to push latch 32 to the right against the action of spring 39.

It may be observed from the description thus far given that spring 39 normally holds latch 32 with the left hand edge thereof against end 36 of plate 24. When motor 21 is to be secured to pin 20, therefore, the motor is first held relative to pin 20 in such fashion that the pin assumes the dotted position shown in Fig. 1. In that position, pin 20 contacts bevel 33 and the sloping end 36 of plate 24. Movement of motor 21 upward and to the left as viewed in Fig. 1 results in pressure being exerted upon bevel 33 by pin 20 in a manner to produce a horizontal component of force in latch 32 toward the right. Thus latch 32 is moved out of the way of pin 20 until the corner 42 of the latch can pass around pin 20, whereupon spring 39 snaps the latch to the left over the pin, thereby locking the pin in groove 35.

Thus pin 20 may be latched in its groove 35 without requiring the execution or performance of an extra latching operation and hence both hands of the user may be employed to support motor 21 as it is being mounted on pin 20.

To remove a motor from pin 20 latch 32 is moved to the right by suitable manipulation of pin 37 by the thumb or finger of the user until an opening is provided between corner 42 and groove 35 of sufficient size to permit pin 20 to pass therethrough. During this operation, the hand manipulating the pin 37 may also be used to support the motor, the base of the motor being grasped between the thumb and the other fingers of the hand.

The form shown in Figs. 3 and 4 differs from the one just described in that the spring and latch are combined in one element. The plate 43, which is to be secured to the attaching flange 23 of a motor base 22 (see Fig. 1) through slots 44 and 45, identical in size and disposition to slots 25 and 26 of Fig. 2, is provided with spaced aligned hooks 46, 47 formed by bending over spaced portions of the end regions of plate 43. Between hooks 46 and 47 is a laterally extending tongue 48, the free end 49 of which is offset from the plane of plate 43. It is contemplated that plate 43 will be supported from a rod 20 by hooks 46, 47 and that the hooks thus will function in the same manner as groove 35.

The latch for preventing rod 20 and hooks 46, 47 from becoming inadvertently separated is a formed spring 50 preferably made from a strip of spring steel. The right hand end 51 of spring 50 is riveted to the free end 49 of tongue 48, and the spring is originally so formed that when right hand end 51 is so riveted the opposite end 52 of spring 50 will be urged against plate 43 with a predetermined amount of force. Intermediate its ends 51 and 52 spring 50 is formed with a shoulder 53 extending substantially at right angles to the general plane of plate 43 and located in such manner that it will bear against pin 20 and will hold said pin snugly against the inner surfaces of hooks 46 and 47.

Free end 52 is bent into a plane which is at an acute angle relative to the general plane of plate 43. It extends downwardly as viewed in Fig. 4 along said oblique plane a sufficient distance to provide a wide opening into which pin 20 may be inserted and hence no great accuracy is required to align the pin with the opening.

When plate 43 is mounted on a motor base 22 and it is desired to support the motor from a pin 20, the motor and its attached plate 43 are initially located over pin 20 in such manner that said pin is disposed between oblique end 52 of spring 50 and plate 43 in substantially the dotted position shown in Fig. 4. The motor and plate are then moved to the left, the movement camming oblique end 52 downwardly in the direction of the dotted position shown in Fig. 4. When pin 20 passes beyond shoulder 53, the built-up force in spring 50 restores the spring to the position shown in solid lines in Fig. 4. In that position, shoulder 53 effectively confines pin 20 between itself and hooks 46, 47. It may be noted that plate 43 may revolve about pin 20 as dictated by the desired or necessary movements of the motor and its attached pulley or other power transmitting device.

To remove a motor from pin 20, free end 52 is manually moved away from plate 43 against the force of spring 50 until shoulder 53 clears pin 20, whereupon plate 43 and the motor to which it is secured may be moved to the right as viewed in Fig. 4 until pin 20 is free of end 52.

A second modification of the latch of Fig. 1 is shown in Figs. 5 and 6. The plate 54 of these latter figures is secured by any suitable means to the attaching flange 23 of a motor base 22 (see Fig. 1), said plate 54 having an upwardly turned flange 55 at the left hand end thereof as viewed in Fig. 5. The upper portion of flange 55 is formed into a hook 56 which is preferably made coextensive with the length of flange 55. The free end 57 of hook 56 is disposed obliquely with respect to the general plane of plate 54.

Pin 20 is adapted to be received in hook 56 and locked in place therein by a pivoted latch 58, said latch being formed from a stamping having a downwardly extending flange 59 at its left hand end and having its right hand end (Fig. 5) curled to receive a pivot pin 60. The pivot pin is supported from a U-shaped hanger 61 secured to plate 54 by rivets 62, on the like. Latch 58 is disposed between the sides of the U-shaped hanger and is thus prevented from moving laterally relative to pin 20. Latch 58 is urged in a clockwise direction as viewed in Fig. 5 by a pair of torsion springs 63, 64, each encircling an end of pivot pin 60 and each having one end 65 bearing against the upright side of hanger 61 and its other end 66 bearing against the underside of latch 58. The tension in the springs is such as to tend to separate ends 65 and 66, thereby resulting in the aforesaid clockwise movement of latch 58 about pin 60. Such clockwise movement is limited, however, by the oblique free end 57 of hook 56 which is struck by the corner 67, formed by flange 59 and latch 58.

In the limiting position of latch 58 in a clockwise direction shown in Fig. 5, flange 59 is of sufficient extent to close the open end of hook 56 around pin 20 so that said pin and hook 56 cannot be separated as long as latch 58 occupies this position.

When it is desired to mount a motor on pin 20, using the Fig. 5 and 6 form of mounting, plate 54 is placed adjacent pin 20 in substantially the position of pin 20 shown on dotted outline in Fig. 5 and then is raised upwardly and to the right, thereby depressing latch 58 and causing it to assume substantially the dotted position thereof shown in Fig. 5. During this movement of latch 58 hook 56 is advanced toward pin 20 until said pin occupies the position shown in solid outline in Fig. 5 whereupon latch 58 is automatically released and springs 63 and 64 then restore the latch to the solid position shown in Fig. 5. In this position, as stated above, pin 20 is retained in hook 56. When it is desired to remove a motor from pin 20, pressure is applied to latch 58 to rotate it counterclockwise (Fig. 5) against the action of springs 63 and 64 until a sufficiently large opening is made between end 57 and corner 67 to permit pin 20 to move to the right and upwardly past the end of flange 55.

Under some conditions it may be inconvenient for the operator or user to manipulate the latch when the manipulative portion thereof is disposed immediately adjacent pin 20. For such situations the modification disclosed in Figs. 7 and 8 may be more desirable. In this modification a separate lever or bar is employed to manipulate the latch, the bar extending to a region of the motor base wherein it may be readily handled by the operator.

Referring now to Figs. 7 and 8, the mounting is in the form of a plate 68 of generally rectangular form having slots 69 corresponding to slots 26 and 25 of Fig. 2 by which plate 68 may be bolted or otherwise secured to the attaching flange 23 of a motor base. The upper end of plate 68 has a groove 70 formed therein which functions in the same manner as groove 35 of Fig. 1 and the hooks 46, 47 of Fig. 3 to engage pin 20 by which the motor is suspended or otherwise secured to a machine. Groove 70 is laterally offset from the general plane of plate 68 and is connected thereto by an oblique region 71. The free end 72 of the plate may be made to extend horizontally to the left as viewed in Fig. 8 from groove 70, or alternatively, may extend downwardly and to the left (not shown) as desired. Its function, as in the forms described above, is to serve as a guide for pin 20 as it is being aligned with groove 70.

The sides of plate 68 are bent upwardly to form substantially parallel flanges 73, only one of which is shown in Fig. 7, it being understood that the right hand end of plate 68 is identical with the left hand end except for a reversal of the relationship of the parts. At the upper end of each flange 73 is a pivot pin 74 on which is mounted a latch 75, the portion of plate 68 aligned with the general plane of latch 75 being notched as at 76 to provide clearance for the latch. The lower portion of each latch 75 has a slot 77 cut in the end thereof in which operates the end 78 of a rod 79 extending transversely across plate 68 from flange to flange.

Latch 75 may be oscillated about its pivot 74 by moving rod 79 toward and away from plate 68. This movement of rod 79 is effected by an operating bar 80 mounted for oscillatory movement on a transverse rod 81 supported on the lower ends of flanges 73. Operating bar 80 is disposed relative to motor mounting 22 at a region thereof wherein it may be readily grasped by the operator or user of the device. It is formed with substantially parallel dog-leg shaped sides 83 the upper ends of which have openings to receive rod 79. Said bar is normally held in the position shown in solid lines in Fig. 8 by one or more torsion springs 82 disposed adjacent sides 83 and having one end 84 thereof bearing against plate 68 and the opposite end 85 bearing against the right hand edge (Fig. 8) of side 83, the spring being so tensioned as to tend to separate said ends 84 and 85.

It may be observed that in the solid position shown in Fig. 8, latch 75 extends into the path of movement of pin 20 when said pin tends to leave groove 70. Thus as long as latch 75 occupies this position, the motor mounting cannot be removed from pin 20, although it is free to rotate about the pin. The mounting may be assembled upon pin 20 by first aligning the mounting relative to the pin so that the pin occupies the position shown in dotted lines in Fig. 8. The mounting is then moved downward and toward the left, this movement causing latch 75 to be turned in a clockwise direction about its pivot 74 until groove 70 is exposed sufficiently to allow pin 20 to enter therein. When pin 20 has passed the outer corner 86 of latch 75, the latch may then be returned to its solid position by the action of spring 82 rotating operating bar 80 in a clockwise direction around its rod 81.

When it is desired to remove motor 21 from pin 20 the operator merely pulls the lower portion of operating bar 80 toward motor mounting 22, which movement, through the rod 79 and slots 77, causes a clockwise movement of latch 75 about its pivot 74 to withdraw the upper end of the latch from the path of movement of pin 20. While operating bar 80 is so held, the mounting is raised from pin 20 until said pin 20 clears the corner 86, whereupon the motor is free to be transported to another location.

Figures 9, 10:
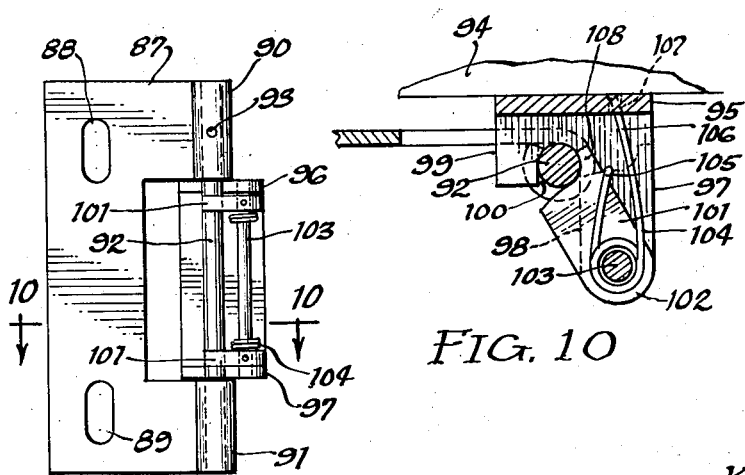
Fig. 9 is a bottom view of a fourth modification.
Fig. 10 is an enlarged front elevation, in section, of the form shown in Fig. 9, taken along line 10—10 thereof.

In the form shown in Figs. 9 and 10, the spring latch is a part of the machine and is duplicated for each machine or appliance to which the motor is to be applied. Thus the mounting is comprised of a plate 87 having aligned slots 88, 89 formed therein for the reception of attaching means provided on the motor base (not shown). The right hand side of plate 87, as viewed in Fig. 9, is formed with spaced aligned curled ends 90 and 91 through which passes a rod 92. In contradistinction to the previous forms, rod 92 is secured to plate 87 by one or more pins 93 passing through the curled ends 90 and through the rod embraced by said ends. Thus rod 92 forms a part of the motor base and is transported from one location to another with the motor. It may be observed that pin 92 has a free span between the curled ends 90 and 91 to which the stationary part of the mounting may be attached.

Secured to the frame or support 94 of each appliance or machine is a U-shaped bracket 95 having downwardly extending sides 96 and 97. Each side is substantially L-shaped in side elevation as viewed in Fig. 10, having a vertically disposed leg 98 and a horizontally disposed leg 99 with a notch 100 formed in leg 99 and constituting in effect an extension of the right hand side of leg 98. The width of notch 100 is substantially equal to or slightly greater than the diameter of rod 92 so that said rod may be received within each notch 100.

Movement of the rod 92 out of notches 100 is prevented by a latch 101 which is pinned to a rod 103 mounted for free rotation in the end region 102 of each leg 98. A torsion spring 104 is wound around rod 103 adjacent each latch 101, one end 105 of the spring bearing against the side of latch 101 and the other end 106 being retained in an opening 107 in bracket 95. The force exerted by spring 101 is such as to tend to separate its ends 105 and 106 and therefore spring 104 will normally tend to rotate latch 101 in a counterclockwise direction. Such rotation of latch 101 will cause the latch to swing into the path of movement of rod 92 as it tends to leave notch 100 and hence will prevent rod 92 and the motor associated therewith from being disassembled from bracket 95 and frame 94. Counterclockwise rotation of latch 101 is limited by a stop 108 formed on the right hand side of the latch (Fig. 10) adapted to engage rod 92 when latch 101 is in a position to block the egress of rod 92 from notch 100.

To assemble a motor and its plate 87 on bracket 95, plate 87 is brought in proximity to bracket 95, with pin 92 substantially in alignment with notches 100. Sides 96 and 97 of the bracket are adapted to be retained within the space defined by the curled ends 90 and 91 of plate 87, and when an approximate alignment is obtained, both as to the sides 96 and 97 of the bracket relative to the space between the ends, and of rod 92 relative to the notches 100, the rod is pressed against the left hand edge (Fig. 10) of each latch 101 and the latch is pushed to the right until the rod contacts the vertically disposed leg 98 of the sides of the bracket. The rod 92 is then moved upwardly along the bracket until it enters notches 100 to the extent shown in Fig. 10. During such movement of rod 92 along the bracket, latch 101 remains rotated in a clockwise direction against the action of spring 104 in substantially the dotted position shown in Fig. 10. After rod 92 passes the upper edge of each latch 101, the latches are free to rotate in the opposite direction into the path of movement of rod 92 to the solid position shown in Fig. 10 as determined by stop 108 where they are held by spring 104.

To remove a motor from a bracket 95, latches 101 are rotated in a clockwise direction by the application of pressure to the left hand edges of the latches as viewed in Fig. 10 until notches 100 are clear, whereupon rod 92 may be lowered past the latches until it is clear of notches 100, whereupon the motor and its mounting are free to be transported to a different location or appliance.

It may be observed that in all of the forms of mounting disclosed herein the application of the motor to a machine frame is accomplished by the simple operation of pushing one of the separable members of the motor mounting against some part of the other member while at the same time depressing a spring biased latch which automatically snaps into a locking position to prevent an inadvertent separation of the mounting. No great skill is required to effect the assembly of the parts of the mounting, nor is any great accuracy required in the lining up of the separable parts before their assembly can be completed. In each instance, both hands of the user or operator are free during the assembly operation to support the motor, and hence the assembly can be effected without requiring that the user or operator possess more than average physical strength. In the disassembly of the mounting, the latch is in each instance so located that it may be moved by the user out of the way as a part of the movement required to hold the motor mounting. For example, the user's thumb may be pressed against the attaching flange 22 or 23 of the motor while his forefinger passes around the end of the attaching flange and engages the latch. By simply pressing his thumb and forefinger together in a movement which would be normally executed in securing a firm hold on the motor mounting, the latch is simultaneously released and the mounting is then ready to be separated.

It is contemplated that the reversal of the location of the pin and plate of each mounting is within the purview of this invention. Thus, the plate in each instance may be permanently secured to each machine and the pin may be a permanent part of the motor and transported therewith from machine to machine.

It is understood, therefore, that the foregoing description is merely illustrative of preferred embodiments of this invention and that the scope of this invention, therefore, is not to be limited thereto, but is to be determined by the appended claims.

We claim:

1. A device for mounting a motor or the like upon a frame, said motor having a laterally extending mounting flange, said device comprising a plate secured to the mounting flange and loose with respect to the frame, said motor being adapted to be carried by grasping the said mounting flange, a pin secured to the frame, a hook on the plate adapted to receive the pin, a latch mounted on the plate and movable across the open end of the hook to retain the pin in the hook, and means mounted on the plate adjacent the mounting flange and resiliently urging the latch across the said open end of the hook, said means being movable toward the mounting flange for moving the latch out of the path of movement of the pin as the pin leaves the hook to uncouple the motor from the frame, said means being grasped with the mounting flange and held in its moved position while the motor and its mounting are being removed from the pin, and said means comprising a bar, a pivoted support on the plate for the bar and means on the support having a pin-and-slot connection with the latch.

2. A device for mounting a motor or the like upon a frame, said motor having a laterally extending mounting flange, said device comprising a plate secured to the mounting flange and loose with respect to the frame, said motor being adapted to be carried by grasping the said mounting flange, a pin secured to the frame, a hook on the plate adapted to receive the pin, a latch mounted on the plate and movable across the open end of the hook to retain the pin in the hook, and means mounted on the plate adjacent the mounting flange and resiliently urging the latch across the said open end of the hook, said means being movable toward the mounting flange for moving the latch out of the path of movement of the pin as the pin leaves the hook to uncouple the motor from the frame, said means being grasped with the mounting flange and held in its moved position while the motor and its mounting are being removed from the pin, said means comprising a bar, said latch being pivoted and having one end adapted to retain the pin in the hook, a slot in the end of the latch opposite the pin retaining end, a pivoted support on the plate for the bar, a pin in one end of the support and extending into the slot, and resilient means urging the support for the bar in a direction to cause the pin retaining end of the latch to move across the open end of the hook.

3. A device for mounting a motor or the like on a frame, said device comprising a plate secured to the motor and having one edge region bent out of the plane of the plate to form a transverse flange, spaced side flanges on the plate disposed substantially at right angles to the transverse flange, notches in the sides of the plate and extending across said bent edge region, a latch pivotally mounted in each side flange and adapted to swing into one of said notches, manually manipulated means connecting the latches to cause said latches to move in unison, said means comprising a bar, spaced pivoted supports connected to the bar and to the latches, the said edge region of the plate bent out of the plane of the plate having a first portion adjacent the plate disposed at an angle less than 90° with the plane of the plate on the side thereof on which the side flanges are disposed and a second portion at an angle of at least 90° with respect to said plane of the plate, a longitudinal groove formed in the said edge region between the said first and second portions thereof, a pin on the frame extending across the notches and adapted to slide along the first said portion and into said groove, said latches being adapted to move into the path of movement of the pin as it tends to leave the groove, said pivoted bar being adapted to move the latches out of the path of movement of the pin.

References Cited in the file of this patent

UNITED STATES PATENTS

| | | |
|---|---|---|
| 1,439,324 | Petersen | Dec. 19, 1922 |
| 1,758,337 | Sheller | May 13, 1930 |
| 2,080,527 | Bixel | May 18, 1937 |
| 2,131,647 | Strege | Sept. 27, 1938 |
| 2,162,400 | Heath | June 13, 1939 |
| 2,326,996 | Fuge | Aug. 17, 1943 |
| 2,433,978 | Bergeron | Jan. 6, 1948 |
| 2,559,736 | Scarborough | July 10, 1951 |
| 2,578,237 | Geistweit | Dec. 11, 1951 |
| 2,686,648 | Oehler | Aug. 17, 1954 |
| 2,695,638 | Gaskell | Nov. 30, 1954 |
| 2,703,431 | Tatom | Mar. 8, 1955 |